(12) United States Patent
Kim

(10) Patent No.: US 8,801,081 B2
(45) Date of Patent: Aug. 12, 2014

(54) APPARATUS FOR REDUCING INJURY TO PASSENGER' FEET DURING OFFSET CRASH

(71) Applicants: Hyundai Motor Company, Seoul (KR); Kia Motors Corporation, Seoul (KR)

(72) Inventor: Do Hoi Kim, Uiwang-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 13/673,645

(22) Filed: Nov. 9, 2012

(65) Prior Publication Data

US 2013/0320706 A1    Dec. 5, 2013

(30) Foreign Application Priority Data

Jun. 4, 2012  (KR) ......................... 10-2012-0059692

(51) Int. Cl.
*B62D 21/15* (2006.01)
(52) U.S. Cl.
USPC .............. 296/187.09; 296/187.1; 296/203.02; 296/204
(58) Field of Classification Search
USPC ............... 296/187.1, 187.09, 187.12, 193.05, 296/203.02, 203.03, 30, 75, 204, 209; 280/784
See application file for complete search history.

(56) References Cited

U.S. PATENT DOCUMENTS

| 6,705,668 B1 * | 3/2004 | Makita et al. ............ 296/187.03 |
| 6,733,040 B1 * | 5/2004 | Simboli ........................ 280/800 |
| 8,177,291 B2 * | 5/2012 | Gosolits et al. .......... 296/193.05 |

FOREIGN PATENT DOCUMENTS

| KR | 1020020034364 A | 5/2002 |
| KR | 2003-0028634 A | 4/2003 |
| KR | 10-2004-0008300 A | 1/2004 |
| KR | 10-0501382 B1 | 7/2005 |
| KR | 10-0580690 B1 | 5/2006 |

* cited by examiner

*Primary Examiner* — Jason S Morrow
(74) *Attorney, Agent, or Firm* — Morgan, Lewis & Bockius LLP

(57) ABSTRACT

An apparatus for reducing injury to a passenger' feet during an offset crash reduces impact energy generated during the offset crash and solve existing problems by eliminating a conventional fourfold welding structure in such a manner that, instead of a conventional reinforced front side rear lower member (member F), a vertical reinforcing member (member Q) of a new structure is fixedly welded to a horizontal reinforcing member (member E), and the bottom of the vertical reinforcing member is spaced apart from a bottom member (member D) to provide an impact absorbing space.

4 Claims, 7 Drawing Sheets

APPARATUS FOR REDUCING INJURY TO PASSENGER' FEET DURING OFFSET CRASH

CROSS-REFERENCE TO RELATED APPLICATION

The present application claims priority of Korean Patent Application Number 10-2012-0059692 filed Jun. 4, 2012, the entire contents of which application is incorporated herein for all purposes by this reference.

BACKGROUND OF INVENTION

1. Field of Invention

The present invention relates to an apparatus for reducing injury to a passenger' feet, which can reduce impact energy that can inflict injury on the passenger' feet during an offset crash.

2. Description of Related Art

In the past, a crash safety test on a vehicle was carried out by crashing the vehicle head-on into a wall such that the vehicle's front-end structure absorbs impact energy.

However, at the moment when the vehicle is crashed, a driver tends to avoid the crash by turning the steering wheel in any direction, and thus in fact, the vehicle is crashed sideways.

This type of crash is applied to a crash test, which is referred to as an offset crash.

In this case, the impact is concentrated on a portion of the front-end of the vehicle, not on the entire front-end, and thus the vehicle body is partially damaged, which means that the front passenger would be in a more dangerous position than the frontal crash.

Most actual accidents are related to the offset crash, and thus many automakers have recently performed offset crash tests as well as frontal crash tests to ensure the safety in vehicle crashes.

Meanwhile, FIG. 1 is a perspective view showing an area where a passenger's feet are placed in a conventional vehicle body, in which a reinforcing material that reinforces a foot apron rear lower member (or front side member) is arranged around (dotted) circle P to prevent injury to a passenger's (or driver's) feet during an offset crash.

FIG. 2 is an enlarged view of circle P in FIG. 1 and shows a plurality of reinforcing members E, F and G placed at the bottom of the area where the passenger's (in particular, the driver's) feet are placed.

Referring to FIG. 2, the members disposed at the rear of the front side member comprise a front side outer member (member A), a front side outer rear lower member (member B), a front side rear lower member (member C), a subframe mounting bracket (member D), and a front side inner member (member I).

Reinforcing members provided in these members comprise a reinforced front side member (member E), a reinforced front side rear lower member (member F), and a reinforced front side rear upper sub-member (member G).

The reinforcing members E, F and G of the front side member prevent the front side member from entering a passenger compartment, thus minimizing injury or impact to the driver's left foot placed on the left side of the driver's seat.

FIG. 3 is a cross-sectional view taken along line X-X of FIG. 2. Referring to FIG. 3, the member A and the member I are disposed on the left side (outside) and the right side (inside) of the front side member, respectively, the member D is disposed at the bottom between the member A and the member I, and the member E is disposed at the top between the member A and the member I, thus forming a substantially box shape.

Here, the reinforcing members E, F and G are fixed to the front side member by spot welding.

The impact energy generated during the offset crash is sequentially transferred to the member D, the members A and I, the member C, the member F, and the bottom of the area where the driver's feet are placed.

The impact energy is dispersed from the member C to the members E and G, and thus the impact energy is reduced.

However, in the case of the box-shaped structure of FIG. 3 where the reinforcing members are spot-welded to the members F, I, C and D in a fourfold manner, the impact load is concentrated on the spot-welded region. As a result, the members fixed by spot welding may be easily separated, and the panel may be torn.

Moreover, the member G is added due to the lack of strength at the fourfold welding region, which increases the weight and cost.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention provides an apparatus for reducing injury to a passenger' feet during an offset crash, which can reduce impact energy generated during the offset crash and solve existing problems by eliminating the conventional fourfold welding structure in such a manner that, instead of a conventional reinforced front side rear lower member (member F), a vertical reinforcing member (member Q) of a new structure is fixedly welded to a horizontal reinforcing member (member E), and the bottom of the vertical reinforcing member is spaced apart from a bottom member (member D) to provide an impact absorbing space.

In one aspect, the present invention provides an apparatus for reducing injury to a passenger's feet during an offset crash, the apparatus comprising: a front side member located at the bottom of an area where the passenger's feet are placed and having a box structure; a horizontal reinforcing member disposed horizontally to cross both sides of the front side member and connecting the both sides of the front side member to increase lateral strength; and a vertical reinforcing member attached to a portion of the horizontal reinforcing member to absorb impact energy applied to the bottom of the front side member.

The vertical reinforcing member may be in the form of a plate and comprise: a vertical main body disposed in the vertical direction (the same direction as impact load direction) to absorb impact energy; an upper flange portion bent in the horizontal direction at an upper end of the vertical main body and fixed to the horizontal reinforcing member; and a lower flange portion bent in the horizontal direction at a lower end of the vertical main body.

A lower end of the vertical reinforcing member may be spaced apart from a bottom member of the front side member to provide an impact absorbing space between the bottom member and the vertical reinforcing member.

The vertical reinforcing member may comprise a plurality of bead portions projecting from a vertical surface the vertical reinforcing member, and the horizontal reinforcing member may comprise a plurality of bead portions projecting inwardly from both sides of the horizontal reinforcing member.

The bead portions of the vertical reinforcing member and the bead portions of the horizontal reinforcing member may be staggered with each other to disperse the impact energy.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention.

Figure 1:
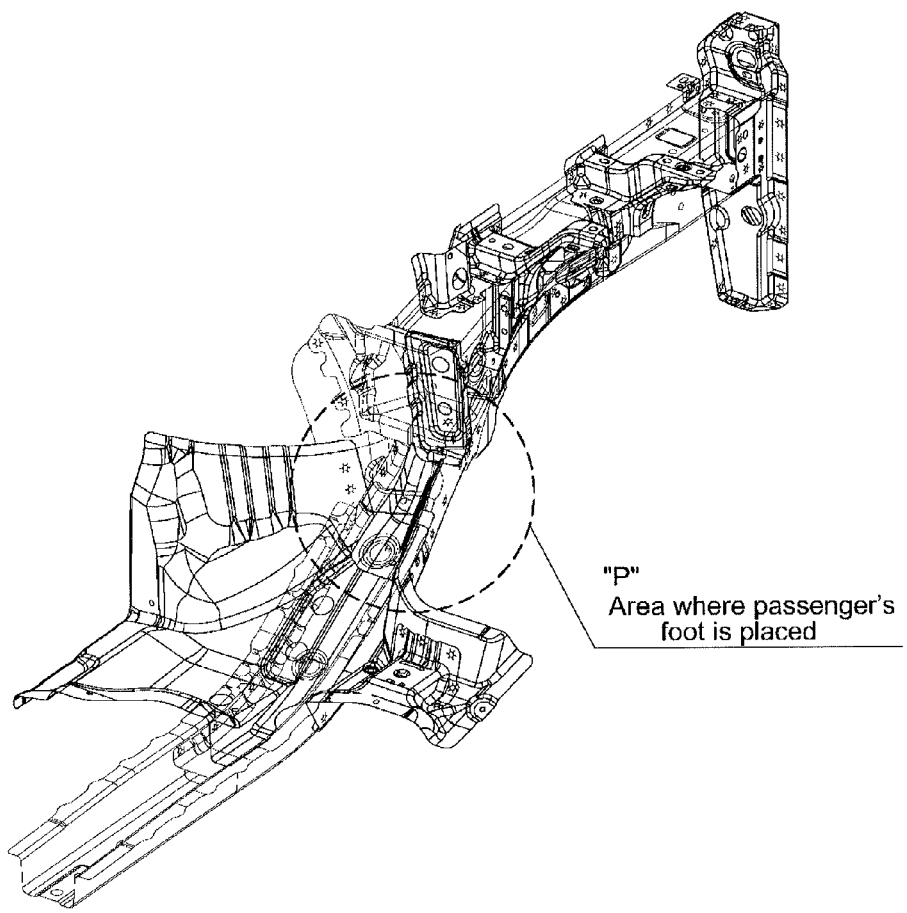
FIG. 1 is a perspective view of a conventional apparatus for reducing injury to a passenger' feet.
Figure 2:
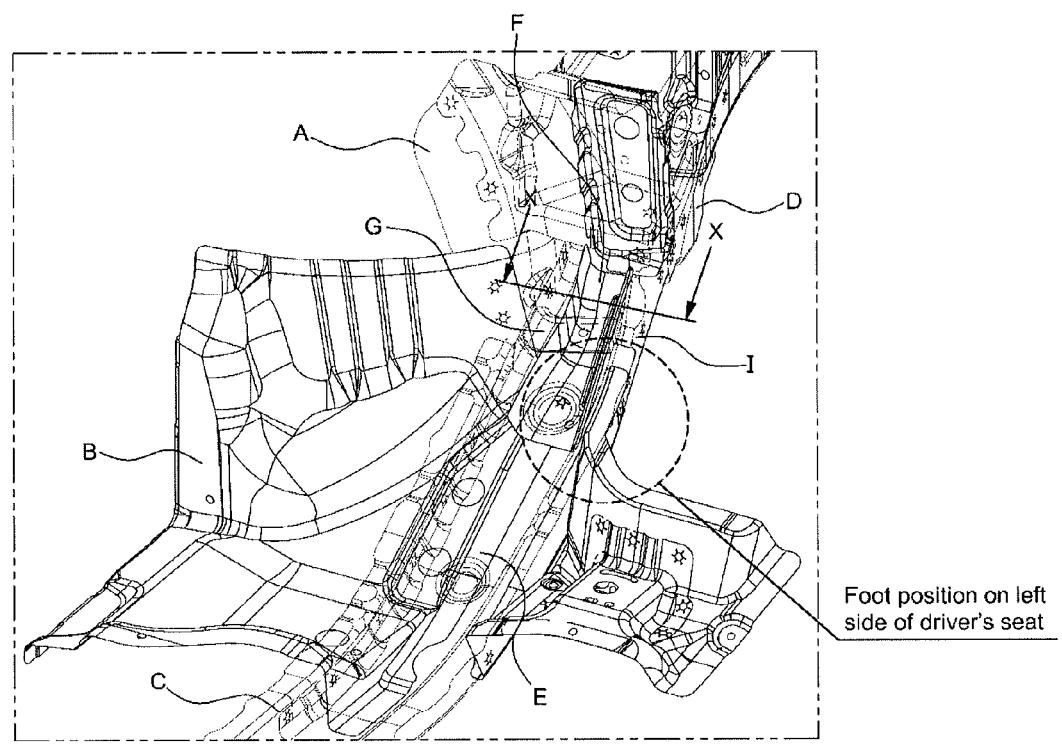
FIG. 2 is an enlarged view of "P" in FIG. 1.
Figure 3:
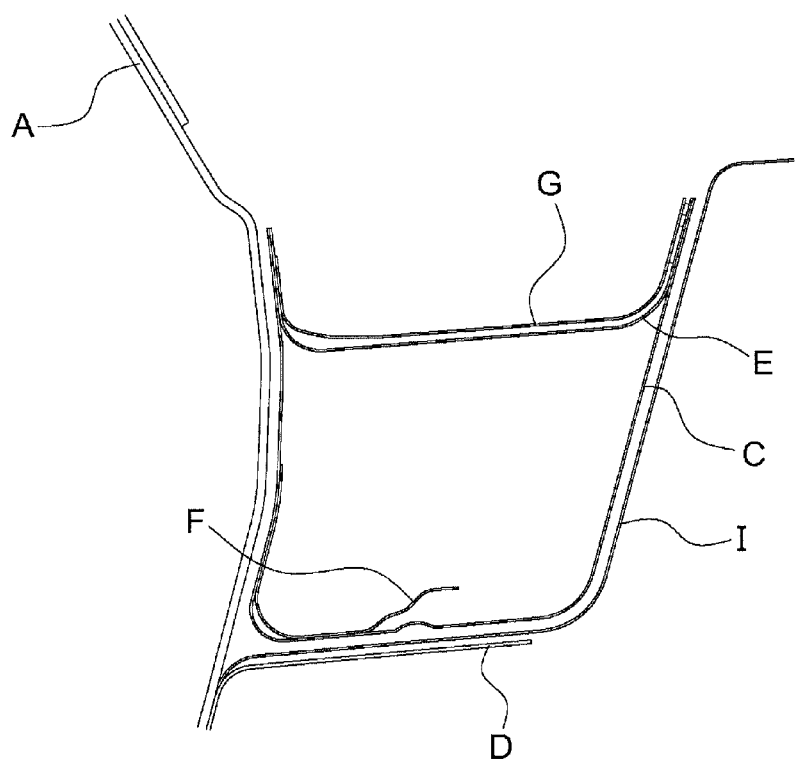
FIG. 3 is a cross-sectional view taken along line X-X of FIG. 2.
Figure 4:
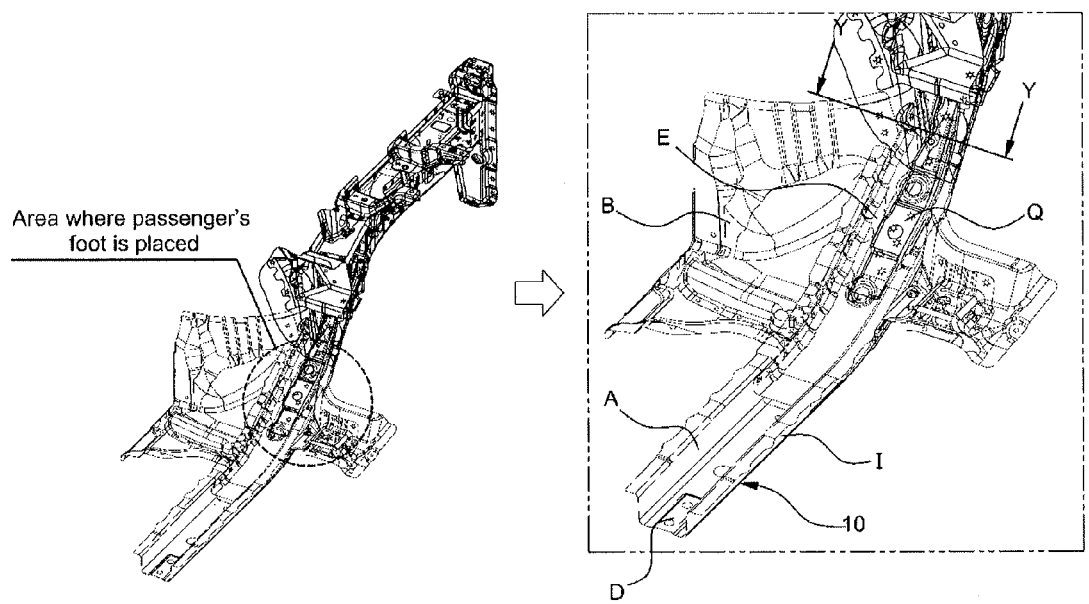
FIG. 4 is a perspective view of an exemplary apparatus for reducing injury to a passenger' feet according to the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The present invention provides an apparatus for reducing injury to a passenger' feet, which can reduce impact energy that can inflict injury on the passenger' feet during an offset crash by reinforcing a rear side of a front side member 10.

The front side member 10 is located in front of a vehicle body and corresponds to an area where a driver's feet are placed. The front side member 10 is reinforced by a reinforcing member of the present invention to improve impact performance.

The present invention improves the impact performance of the front side member 10 and, at the same time, to solve the existing problems by eliminating a conventional fourfold welding structure including a reinforced front side rear lower member (member F), a front side rear lower member (member C), a front side inner member (member I), and a subframe mounting bracket (member D).

In order to eliminate the fourfold welding structure including the members F, C, I and D, according to the present invention, the member C is eliminated from the existing front side member 10, the member Q, not the member F, is fixed to member E by twofold welding, and the member Q is spaced a predetermined distance from the bottom of the member I, thus providing an impact absorbing space.

Figure 5:
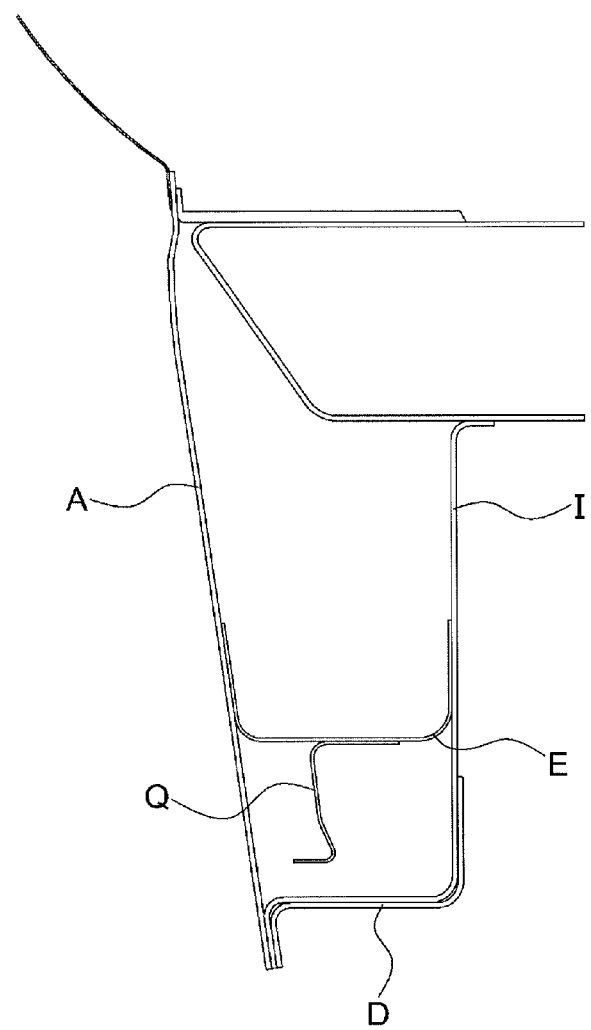
FIG. 5 is a cross-sectional view taken along line Y-Y of FIG. 4.
Figure 6:
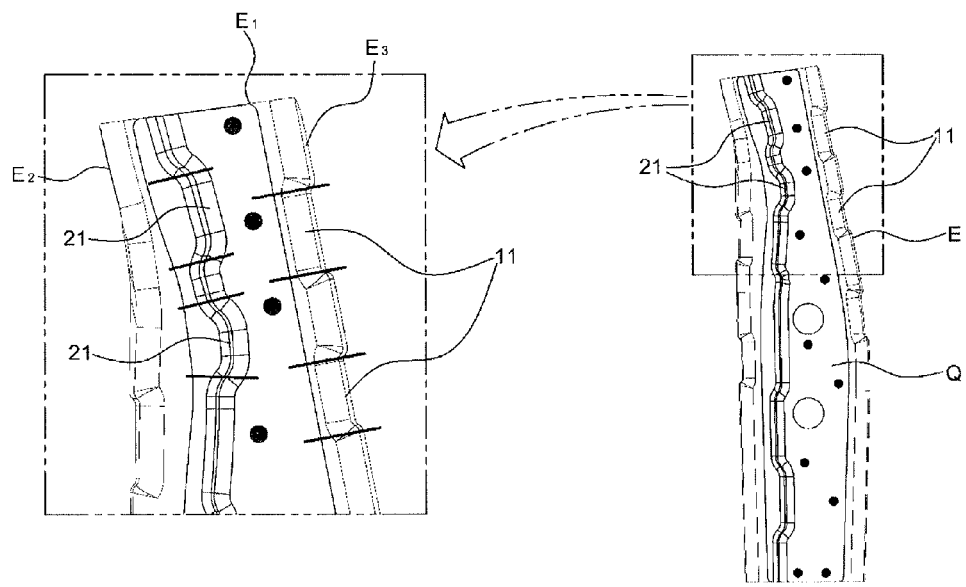
FIG. 6 is a plan view showing that a vertical reinforcing member is fixedly welded to a horizontal reinforcing member and bead portions are arranged to be staggered with each other.
Figure 7:
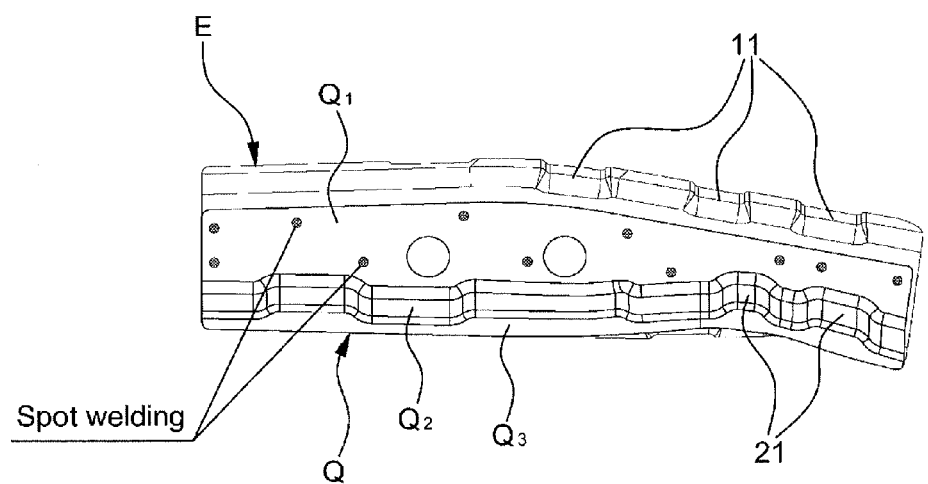
FIG. 7 is a bottom view of FIG. 6.
Figure 8:
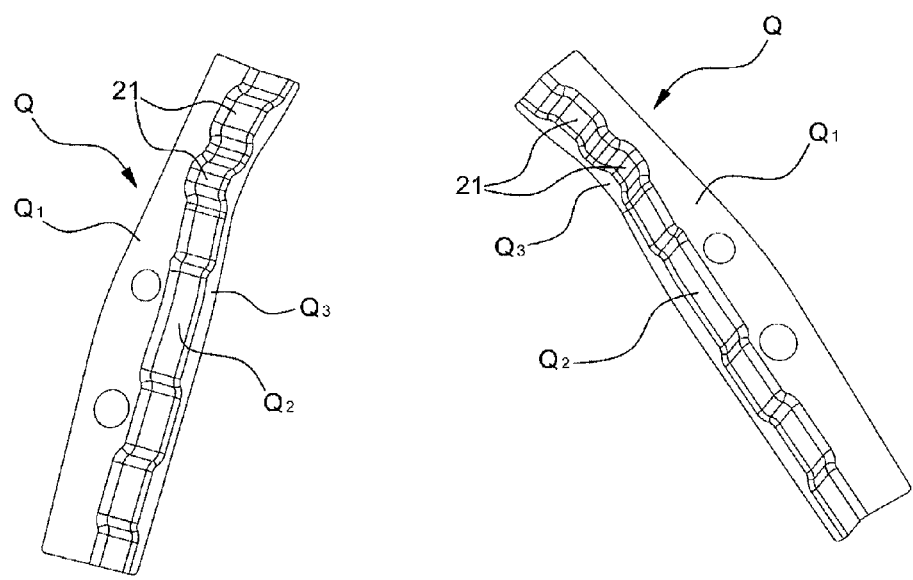
FIG. 8 is a perspective view and a bottom perspective view of a vertical reinforcing member of FIG. 6.

As shown in FIG. 5, the front side member 10 according to the present invention comprises an external side member A, an internal side member I disposed on the inner side, a bottom member D disposed at the bottom between the two side members A and I, and a horizontal reinforcing member E inserted between the two side members A and I.

The external side member A, the internal side member I, and the bottom member D are configured in the same manner as the existing members A, I, and D, respectively.

Although the external side member A, the internal side member I, and the bottom member D may be separately configured and welded, a single member may be integrally and/or monolithically formed by press molding, for example, or other suitable means if necessary.

The horizontal reinforcing member E is a U-shaped member which connects the external side member A and the internal side member I in the width direction. Both ends of the horizontal reinforcing member E are fixedly welded to the external side member A and the internal side member I, respectively, thus increasing lateral strength of the two side members.

The present invention further comprises a vertical reinforcing member Q fixedly welded to the horizontal reinforcing member E.

The vertical reinforcing member Q in accordance with various embodiments of the present invention is vertically fixed to the bottom of the horizontal reinforcing member E to transfer impact energy transmitted through the bottom member D to the horizontal reinforcing member E and, at the same time, minimize the impact energy during an offset crash.

The vertical reinforcing member Q has the same or similar length to the entire length of the horizontal reinforcing member E to uniformly disperse and transfer the impact energy and is fixedly attached to the center of the bottom of the horizontal reinforcing member E along the center line in the width direction.

The vertical reinforcing member Q is fixedly attached to an area where the impact load is concentrated, i.e., to a portion of the horizontal reinforcing member E (moved slightly to the left from the center in the width direction) so as to maximally absorb the impact energy with a small amount of material (i.e., with a small size (section modulus)).

Moreover, it is preferred that an upper end of the vertical reinforcing member Q be brought into surface contact with the bottom of the horizontal reinforcing member E so as to firmly fix the vertical reinforcing member Q to the horizontal reinforcing member E.

The structure of the vertical reinforcing member Q will now be described in more detail. The vertical reinforcing member Q is in the form of a plate and comprises a vertical main body Q2 disposed vertically with respect to the horizontal plane of the horizontal reinforcing member E, an upper flange portion Q1 bent perpendicularly from the upper end of the vertical main body Q2, and a lower flange portion Q3 bent perpendicularly from the lower end of the vertical main body Q2. The vertical reinforcing member Q having the above-described configuration may be formed into various shapes by press molding.

The upper flange portion Q1 is bent laterally with respect to the vertical plane of the vertical main body Q2 to be brought into surface contact with the horizontal reinforcing member E and fixed thereto by welding.

Moreover, the vertical main body Q2 of the vertical reinforcing member Q is disposed in the same or parallel direction with respect to the impact load transferred from the bottom member D of the front side member 10, thus maximally absorbing the impact load at a point where the impact load is applied.

The lower flange portion Q3 of the vertical reinforcing member Q is bent laterally in a direction opposite to the upper flange portion Q1, thus further absorbing the impact load.

Moreover, the vertical reinforcing member Q is firmly welded to the horizontal reinforcing member E. The length of the upper flange portion Q1 of the vertical reinforcing member Q is the same as that of the vertical reinforcing member Q such that the upper flange portion Q1 is continuously bent over the entire length of the vertical reinforcing member Q. The width of the upper flange portion Q1 is smaller than that of the horizontal reinforcing member E, for example, about half or less than half of the width of the horizontal reinforcing member E, thus preventing the vertical reinforcing member Q from being separated from the horizontal reinforcing member E by the impact load. Moreover, it is preferred that the upper flange portion Q1 have a sufficient strength to withstand the impact load.

Furthermore, the present invention provides a bead portion 21 having a C-shaped curved surface in the horizontal direction, not a plane, with respect to the vertical surface of the vertical main body Q2 of the vertical reinforcing member Q, thus maximizing the absorption of impact energy.

For example, the bead portion 21 has a recessed or projecting shape in the lateral direction with respect to the vertical surface of the vertical main body Q2 of the vertical reinforcing member Q.

Here, the bead portion 21 refers to a structural shape suitable for assemblability and strength between the horizontal reinforcing member E and the vertical reinforcing member Q, i.e., a concave-convex structure in the lateral direction.

Moreover, a bead portion 11 is also provided in the horizontal reinforcing member E to add welding points, the bead portion 11 projecting inwardly from both sides of the horizontal reinforcing member E.

The structure of the horizontal reinforcing member E will now be described in more detail. The horizontal reinforcing member E comprises a horizontal main body E1 disposed to cross the side member of the front side member 10 and a side fixing portion E2 extending upwardly from both ends of the horizontal main body E1 and coming into surface contact with the side member.

The bead portions 11 of the horizontal reinforcing member E are formed on both sides of the side fixing portion E2 in the longitudinal direction, and each bead portion 11 projects laterally, when viewed from the inside, to be spaced apart from the side member in the width direction.

Here, the upper flange portion Q1 of the vertical reinforcing member Q is fixed to the horizontal main body E1 of the horizontal reinforcing member E with several welding points by spot welding.

In particular, when the vertical reinforcing member Q is fixed to the horizontal reinforcing member E, the bead portions 11 of the horizontal reinforcing member E and the bead portions 21 of the vertical reinforcing member Q are arranged staggered with each other in the longitudinal direction of the horizontal reinforcing member E, thus dispersing the impact energy.

The absorption and dispersion of impact energy by the vertical reinforcing member Q and the horizontal reinforcing member E according to the present invention will now be described in more detail.

The impact load is vertically applied to a portion of the horizontal plane of the bottom member D and, when the impact load is applied to the bead portion 21 of the vertical reinforcing member Q according to the present invention, each of the bead portions 11 and 21 has a large area to which the impact load is applied due to the C-shaped curved surface, compared to a plane structure.

This is because, when the same impact load is applied to different areas, a larger area absorbs more impact energy. Thus, the bead portions 11 and 21 having the curved surfaces according to the present invention absorb much more impact energy when the impact load is applied thereto, compared to the plane structure.

This principle is applied to all the side fixing portion E2 of the horizontal reinforcing member E and the vertical main body Q2 of the vertical reinforcing member Q, each having the curved surface.

Moreover, according to the present invention, in which the bead portion 11 of the horizontal reinforcing member E and the bead portion 21 of the vertical reinforcing member Q are disposed staggered with each other in the longitudinal direction, it is possible to uniformly disperse the impact load compared to the bead portions 11 and 21 arranged collinearly in the width direction.

As described above, the apparatus for reducing injury to a passenger' feet during an offset crash according to the present invention has the following advantages.

First, the vertical reinforcing member is fixed to the horizontal reinforcing member, not to the bottom member of the front side member, to provide a twofold welding structure, not the existing fourfold welding structure, and thus it is possible to prevent the impact load from being concentrated during an offset crash and to increase the impact strength, compared to the conventional structures.

Second, the existing fourfold welding structure is changed to the twofold welding structure to improve the impact absorption performance, and thus it is possible to eliminate the additional reinforcing member (member G) for increasing the impact strength, thus reducing the weight and cost.

Third, the vertical reinforcing member is spaced upwardly from the bottom member to provide an impact absorbing space between the vertical reinforcing member and the bottom member, and thus the impact load is sequentially applied to the bottom member and the vertical reinforcing member at time intervals, thus improving the effect of reducing the impact energy.

For convenience in explanation and accurate definition in the appended claims, the terms upper or lower, front or rear, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for reducing injury to a passenger's feet during an offset crash, the apparatus comprising:
    a front side member located at a bottom of a passenger foot area and having a box structure;
    a horizontal reinforcing member disposed horizontally to cross first and second sides of the front side member and connecting the first and second sides of the front side member to increase lateral strength; and
    a vertical reinforcing member attached to a portion of the horizontal reinforcing member to absorb impact energy applied to the bottom of the front side member,
    wherein the vertical reinforcing member comprises a plurality of bead portions projecting from a vertical surface the vertical reinforcing member, and the horizontal reinforcing member comprises a plurality of bead portions projecting inwardly from both sides of the horizontal reinforcing member.

2. The apparatus of claim 1, wherein the vertical reinforcing member is in the form of a plate and comprises:
    a vertical main body disposed in a vertical direction to absorb impact energy;
    an upper flange portion bent in the horizontal direction at an upper end of the vertical main body and fixed to the horizontal reinforcing member; and
    a lower flange portion bent in the horizontal direction at a lower end of the vertical main body.

3. The apparatus of claim 1, wherein a lower end of the vertical reinforcing member is spaced apart from a bottom member of the front side member to provide an impact absorbing space between the bottom member and the vertical reinforcing member.

4. The apparatus of claim 1, wherein the bead portions of the vertical reinforcing member and the bead portions of the horizontal reinforcing member are staggered with each other to disperse the impact energy.

* * * * *